United States Patent [19]
Malmström et al.

[11] Patent Number: 5,131,944
[45] Date of Patent: Jul. 21, 1992

[54] METHOD AND APPARATUS FOR TREATING ZINC CONCENTRATES

[75] Inventors: Rolf Malmström, Helsingfors, Finland; Stig Petersson, Skelleftehamn, Sweden

[73] Assignee: A. Ahlstrom Corporation, Karhula, Finland

[21] Appl. No.: 609,531

[22] Filed: Nov. 6, 1990

[30] Foreign Application Priority Data

Nov. 10, 1989 [FI] Finland ............... 895358

[51] Int. Cl.$^5$ ............................................. C22B 19/20
[52] U.S. Cl. ......................................................... 75/655
[58] Field of Search ........................................... 75/655

[56] References Cited

U.S. PATENT DOCUMENTS 4,252,563 2/1981 Sundström ............................ 75/655
4,741,770 5/1988 Andrews ............................... 75/655

Primary Examiner—Peter D. Rosenberg
Attorney, Agent, or Firm—Nixon & Vanderhye

[57] ABSTRACT

A method and apparatus for treating zinc concentrates in order to recover zinc. The method includes an oxidizing and smelting stage (10) and, subsequent to the smelting stage, a fuming stage (20) in which the zinc-oxide-containing slag formed in the smelting stage is so reduced as to remove the metallic zinc with the exhaust gases (28). Part of the reduced slag is discharged during the fuming stage, another part (32) is recirculated to the smelting stage. In accordance with a preferable method, the slag is reduced in two successive fuming stages (20, 40). In an apparatus according to the invention, the slag circulation between the fuming and smelting stages is facilitated by overflows arranged in the partition walls (19) between the various stages.

12 Claims, 3 Drawing Sheets

5,131,944

METHOD AND APPARATUS FOR TREATING ZINC CONCENTRATES

BACKGROUND AND SUMMARY OF THE INVENTION

The present invention relates to a method of treating zinc concentrates for recovering zinc, and especially to a method for recovering zinc which includes successive smelting (and oxidizing) and fuming steps. During the smelting and oxidizing stage, zinc concenrate is oxidized and smelted by supplying gas containing air or oxygen into it, whereby sulphur dioxide is exhausted and the zinc oxide thus produced is slagged. The slag produced in the smelting and oxidizing stage is then reduced in a first fuming stage by supplying some reducing agent, such as coal or hydrocarbon, whereby a reducing gas containing, for example, CO, CO2 and metallic zinc is exhausted. Slag is then discharged from first fuming stage.

The invention also relates to an apparatus for treating zinc concentrates, the apparatus including a smelting furnace and a slag treating furnace arranged in connection therewith. A partition wall separates gas spaces of the smelting and slag treating furnaces from each other, and another partition wall separates the slag layers from each other.

Today, almost all zinc is produced by a hydrometallurgical process, i.e. by electrolysis, or by a pyrometallurgical process in accordance with the ISP, i.e. Imperial Smelting Process.

According to the electrolytic process, which is usually used for zinc concentrates with a high content of zinc, the zinc oxide is leached directly out of a calcined zinc concentrate. The solution of zinc is purified, and zinc is recovered from the purified solution by means of electrolysis, whereby metallic zinc is precipitated eletrolytically. For a good yield of zinc, iron must be leached out and then precipitated, usually as jarosite or goethite. Jarosite, however, poses a great waste problem, partly because it is produced in large amounts and must be stored, and partly because it may contain Zn and possibly Cd, both of which, at least in large amounts, are considered toxic. As a result, it has become more and more difficult to obtain permission to store any significant quantity of jarosite.

Various ways have been explored for changing jarosite to a form in which it could be stored without causing any harm to the environment. Different hydrometallurgical methods have been suggested. For example, leaching processes which produce iron oxide with fine particles have been recommended. However, it is difficult to find a practical use for iron oxide comprised of fine particles. Smelting processes for producing an end product suitable for storing have also been suggested. Drying and smelting of jarosite would, however, call for a considerable heat volume.

In accordance with the pyrometallurgical ISP process, it is also possible to recover zinc from ore concentrates having a relatively low zinc content. The process involves two stages. First, the zinc concentrate is treated in a sintering or calcinating stage in order to separate SO2 and to oxidize Zn to ZnO. In a second, separate stage, the product containing zinc oxide is smelted in a smelting furnace. Coke is used in the smelting process as both fuel and reducing agent. Entrained with the reduction gases, metallic zinc is discharged from the smelting furnace and is usually retained in a splash condenser. The zinc recovered from the ISP process, however, is not of as high a quality as the zinc recovered from the eletrolytic process.

In PCT application WO 87/03010, it has also been suggested to recover zinc by direct oxidizing and smelting of zinc concentrate to metallic zinc. According to that method, smelting, oxidizing and reducing are effected in a two-stage furnace, where a smelting furnace and a fuming furnace together form a unit. The furnace is divided into a smelting section with an oxidizing zone and a fuming section with a reducing zone by means of a vertical partition wall which divides the upper section of the furnace into two parts. The partition wall is so arranged in the furnace as to effect transport of slag between the various zones under the partition wall. Zinc concentrate and oxidizing gas are introduced into the smelting furnace or the oxidizing zone by means of lances in order to slag zinc to zinc oxide and to drive off $SO_2$.

The slag containing zinc oxide is conducted, below the partition wall, from the oxidizing zone to the fuming furnace for reduction of the slag. A reducing agent is introduced into the reducing zone by means of lances, whereby zinc oxide is reduced to metallic zinc, which is discharged from the furnace with the exhaust gases.

U.S. Pat. No. 4,741,770 discloses a method of recovering zinc from zinc concentrate containing iron. This takes place in a furnace which is divided into a smelting section having an oxidizing zone, and a fuming section having a reducing zone. Zinc concentrate slags to produce zinc oxide in the oxidizing zone and is thereafter conducted to the reducing zone. In the reducing zone, ZnO is reduced to Zn, which is exhausted with the flue gases. The flue gases and the slag in the reducing zone are provided with heat energy by means of combusting part of the reducing gases remaining in the reducing zone directly above the slag surface. Iron containing slag is tapped off of the reducing zone.

According to the method disclosed in the above-mentioned US patent, part of the slag discharged from the fuming section may be conducted to an additional reduction stage, where part of the iron contained in the slag is reduced. The reduced iron is recirculated to the fuming section where it contributes to the reduction of ZnO to Zn. The slag from the additional reduction stage may then be led to the smelting furnace in order to facilitate the slagging of the ferrous zinc concentrate.

In spite of direct circulation of smelted slag from the smelting furnace to the fuming furnace, utilization of the iron contained in the ore concentrate for reduction of ZnO, and recirculation of slag from the additional iron reduction stage to the smelting furnace, the energy requirement of the processes described above is relatively high.

Zinc recovery from ore concentrates rich in zinc involves a problem with slagging because the zinc content of zinc slag cannot exceed 25%; otherwise its viscosity becomes too high. Addition of further slag components for maintaining the zinc concistency at a low level for obtaining a maximal amount of zinc oxide from the slag calls for more energy for heating and smelting the slag components.

An object of the present invention, therefore, is to provide a method for recovering zinc from zinc concentrate, in which method the need for reducing agents and fuel, such as coal or hydrocarbon, is considerably lower in comparison with the prior art methods described above.

Another object of the present invention is to provide a method of producing a slag which is easier to store.

A still further object of the present invention is to provide a simple and compact apparatus for recovering zinc from zinc concentrate.

An exemplary method of recovering zinc according to the invention is characterized in that part of the slag discharged in the first fuming stage is directly recirculated to the smelting and oxidizing stage in order to recover zinc oxide from the slag in the smelting and oxidizing stage. The slag formed in the smelting and oxidizing stage is preferably reduced in two successive fuming stages so that slag from the smelting stage is reduced in the first fuming stage to a zinc content of 5 to 15%, preferably >10%;

part of the discharged, reduced slag from the first fuming stage is recirculated to the smelting and oxidizing stage; and another part of the discharged, reduced slag is further led to a second fuming stage, where the slag is reduced to a zinc content <5%, and preferably <2%.

The apparatus for separating zinc from zinc concentrate according to the invention is characterized in that the slag treating furnace is divided into an inlet zone and an actual fuming zone by means of a partition wall extending downwardly from the ceiling of the furnace, the partition wall being so arranged that the upper gas spaces and the upper slag layers of both the inlet zone and the fuming zone are separated from each other, and that the inlet zone and the fuming zone are in communication mainly in the lowest part of the furnace;

an overflow is arranged in the partition wall between the smelting furnace and the inlet zone so as to facilitate slag flow from the smelting furnace, where the slag level is higher, to the inlet zone; and a second overflow is arranged in the partition wall between the actual fuming zone and the smelting furnace so as to facilitate flowing of reduced slag to the smelting furnace from the fuming zone, where the slag level has been raised over the slag level in the smelting furnace, by injecting air, coal or hydrocarbon.

The zinc concentrate, i.e., zinc sulfide concentrate may be oxidized and smelted in a flash furnace, cyclone furnace or some other furnace suitable for smelting of ore concentrate. The smelted slag containing zinc oxide may be led directly to a continuous process in a slag treating furnace for reduction of zinc to metallic zinc, whereby the slag may be transported by means of a pouring ladle from the smelting furnace to the slag treating furnace. This process may also be effected in batches.

The problem arising from too high slag viscosity with high zinc content when zinc is recovered from a concentrate rich in zinc is avoided in this invention by recirculation of slag poor in zinc from the slag treating furnace to the smelting stage. The slag poor in zinc lowers the zinc consistency of the slag in the smelting stage, whereby the slag maintains its viscosity. Addition of ready-smelt hot slag does not require any additional energy for heating or smelting. Slag may be recirculated to such an extent that a so-called saturation limit of zinc is achieved. The saturation limit is determined by the viscosity of the slag. A majority of zinc concentrates have the saturation limit in about 25% zinc consistency. Slag from the slag treating furnace may be transported either continuously to the smelting furnace or by means of a pouring ladle.

Fuming i.e. reduction of Zn from the slag, may be effected in a conventional fuming furnace, electric furance, a furnace provided with lances or some other type of furnace suitable for a reduction process.

The zinc is discharged from the slag treating furnace with the exhaust gases in the form of volatile metallic zinc. The zinc may be oxidized to ZnO and be separated eletrolytically or be condensed directly from the exhaust gases in a splash condenser.

According to the invention, the need for a reducing agent and fuel for the zinc process is considerably decreased by means of effecting the zinc oxide reduction in two stages. In the first stage, the slag is reduced to a zinc consistency of 5 to 15 %, preferably to about 10%. Reduction to a zinc consistency of 5 to 10% is very fast and easy to perform, and the need for reducing agents is considerably lower with a high zinc content than with a zinc content below 5%.

Part of the slag from the first reduction stage is recirculated to the smelting furnace and only, for example, 25 to 50% of the slag is led further to a second reduction stage, to be reduced there to a zinc content <2%. The amount of slag in the second reduction stage is considerably lower than in the first reduction stage. The amount of slag in the second reduction stage is a function of the Fe or $SiO_2$ content of the ore concentrate. Since only a little amount of slag is reduced to a low zinc content, the need for reducing agents is much lower than if the whole slag amount from the first reduction stage were reduced to a low zinc content. An inert silicate slag is recovered from the second reduction stage, i.e. a slag which does not easily react and which is therefore easy to both store and utilize for various purposes.

In accordance with a preferred embodiment of the invention, transport with pouring ladles can be avoided by combining the smelting furnace and the slag treating furnace into one unit. The slag treating furnace is so constructed as to provide continuous recirculation of slag from the fuming zone into the smelting furnace and transport of slag from the smelting furnace to the inlet zone of the slag treating furnace.

It will therefore be appreciated that, according to the invention, a process consistent with enviromental requirements has been developed, which also provides advantages in terms of energy efficiency. If the invention is applied to a process with electrolytic zinc recovery, the process will be simpler because the acid leaching stage and the iron precipitation stage are no longer necessary since the iron remains in the slag. A further advantage of the novel method according to the invention is that the slag received is inert and easy to store. The method of recovering zinc according to the invention also consumes less coal or hydrocarbon than the ISP process. In addition, concentrates rich in zinc ore may be utilized without any need for adding large amounts of slag-forming components.

Additional objects and advantages of the invention will become apparent from the detailed description which follows.

DETAILED DESCRIPTION OF THE DRAWINGS

Figure 1:
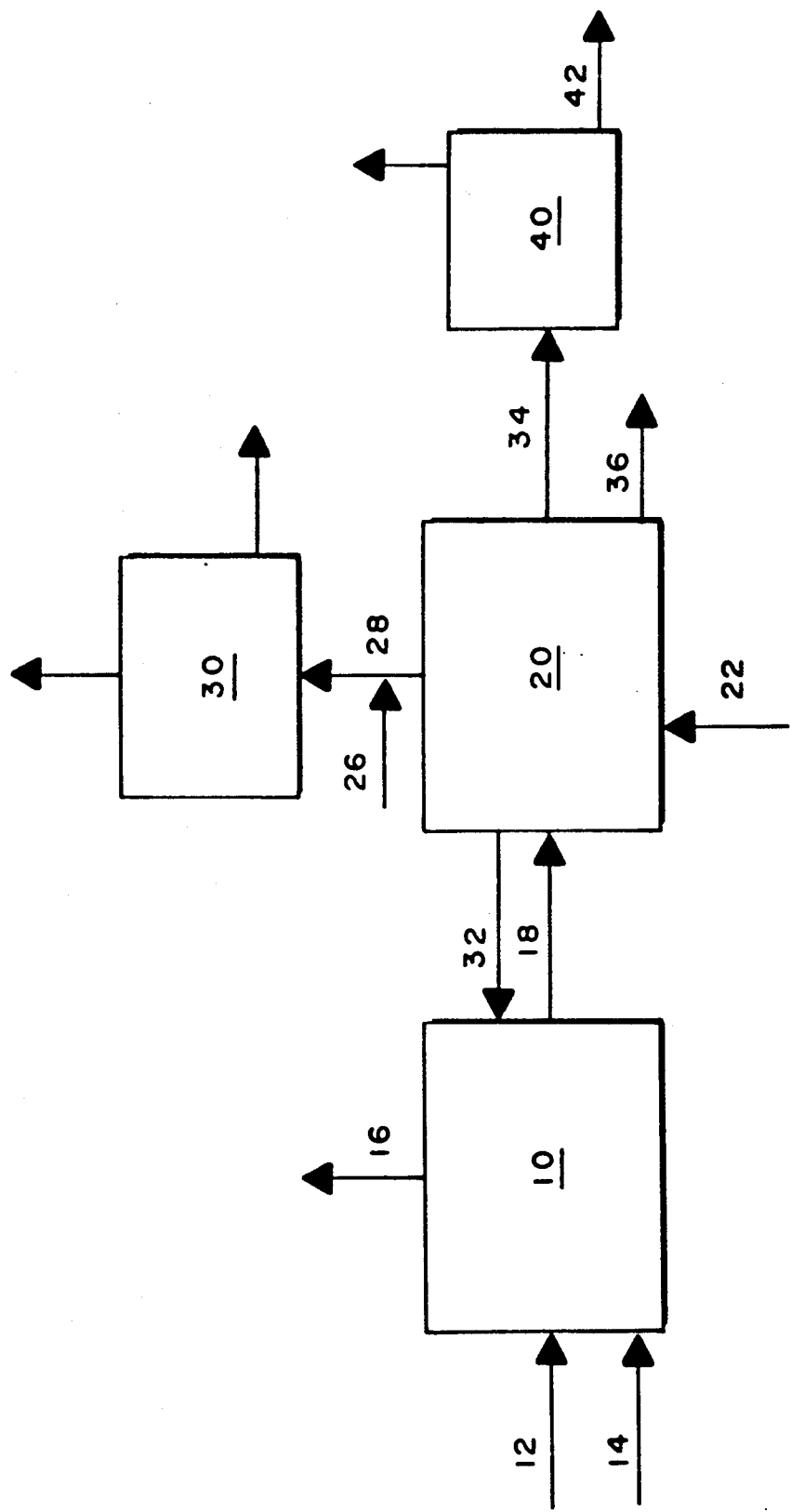
FIG. 1 is a basic scheme of a method according to the invention.

In FIG. 1, reference number 10 indicates a smelting furnace where zinc concentrate introduced through an inlet duct 12 is smelted and then slagged by means of air or other gas containing oxygen, which gas is supplied through an intake 14. Exhaust gases containing sulphur dioxide are exhausted from the smelting furnace through an outlet duct 16. Some ZnO and possibly PbO are discharged with the exhaust gases. The amount of ZnO and potential PbO in the exhaust gas is dependent on the zinc concentrate and the amount of air. Slag, formed in the smelting furnace, is led via canal 18 into the slag treating or fuming furnace 20. In the fuming furnace, the slag is reduced by means of coal or hydrocarbon injected through nozzles 22. The heat in the fuming furnace is maintained by partial combustion with air or gas containing oxygen, which is also supplied via nozzles 22. Zinc oxide is reduced to metallic zinc, which is in a volatile form at the fuming temperature and is exhausted from the fuming furnace with the reducing gases through an outlet duct 28. The exhaust gases mainly consist of CO, $CO_2$, possibly $H_2$ and $H_2O$ if hydrocarbon has been used in the reduction.

Both Zn and ZnO may be discharged with the exhaust gases from the fuming stage. At lower temperatures, zinc is oxidized to zinc oxide. According to the process, which is schematically shown in FIG. 1, the gases and metals are oxidized in the exhaust gases by supplying air to the exhaust gases in the outlet duct 28. The air is introduced via intake 26. The oxidized exhaust gases are thereafter taken to a heat recovery unit 30. ZnO is further led to an electrolytic Zn recovery stage.

If the zinc is separated as metallic zinc, the temperature of the exhaust gases is preferably maintained so high that the reaction equilibrium favours Zn over ZnO. The exhaust gases containing metallic zinc are thereafter quickly conducted through a short outlet duct into a splash condenser for condensing the zinc vapors.

In certain cases, it is desirable to separate zinc as zinc oxide, whereby the zinc is oxidized in or after the fuming furnace. The zinc oxide may then be introduced into an electrolytic process for precipitation of zinc.

The zinc oxide recovered from the gas stream provides a most suitable material for leaching in an electrolytic process. In this case, the zinc oxide may be leached in a neutral leaching process, and it does not require any acid leaching like conventional zinc recovery, which is effected by electrolysis. The leached residual is completely inert. Depending on the initial concentrate, the leached residual may mainly consist of $PbSO_4$, which is suitable for further refining. By the method according to the invention, formation of jarosite is avoided in leaching because the iron oxide remains in the slag in the fuming furnace.

The slag is reduced in the fuming furnace mainly to fayalite slag having a zinc content of 5 to 15%. In accordance with flow sheet in FIG. 1, part of the reduced slag is recirculated from the fuming furnace to the smelting furnace via canal 32. The recirculated slag contributes to the addition of the slag volume in the smelting furnace, which facilitates the smelting and slagging of the zinc concentrate. In slagging of ore concentrate with a high zinc content, which would produce slag containing >25% zinc, recirculation contributes to the decrease in the zinc content of the slag present in the smelting furnace.

Thus, recirculation of slag from the fuming stage to the smelting and oxidizing stage provides a simplification of the smelting process itself. The slag to be recirculated need not be completely zinc-free as was earlier the case, but it may contain, for example, 10% zinc. Thus, fuming to a zinc content of 10% in the reduction stage requires a considerably smaller amount of reducing agent than conventional fuming to about 1% zinc.

Another part of the reduced slag is taken from the fuming furnace through a canal 34 to a second reduction stage 40. In the second reduction or fuming stage, the slag is reduced to a zinc content <5%, preferably <2% and is thereafter taken out as inert silicate slag. The exhaust gases from the second reduction stage 40 may be treated in the same way as the exhaust gases from the first reduction stage. These exhaust gases may be treated successively or simultaneously.

If the coal consumption in a conventional fuming process is about 1.5 to 2 kg coal/kg Zn, in reduction to about 1% zinc in the slag, the corresponding value in the fuming process according to the invention is only about 0.5 kg coal/kg Zn.

Copper and precious metals which have been introduced into the fuming furnace through the primary feed of non-combustible sulphides to the smelting furnace, or through addition of sulphides to the fuming process itself, remain in matte, which is discharged from the bottom of the fuming furnace through an outlet opening 42 in the fuming furnace 40, or through an outlet opening 36 from the fuming furnace 20.

Figure 2:
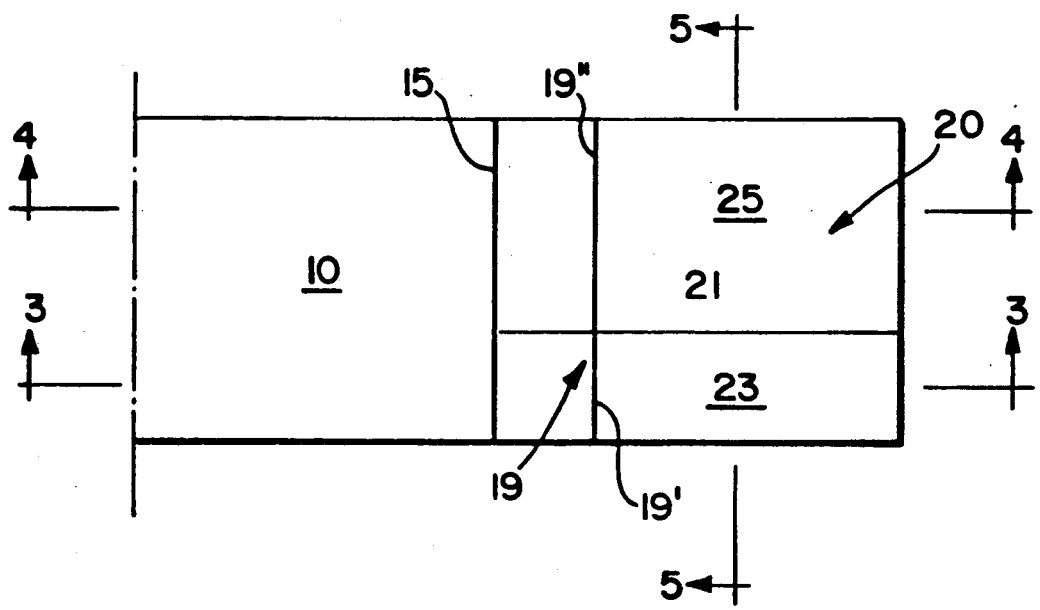
FIG. 2 is a cross-sectional top view of a combined smelting and slag treating furnace.
Figure 3:
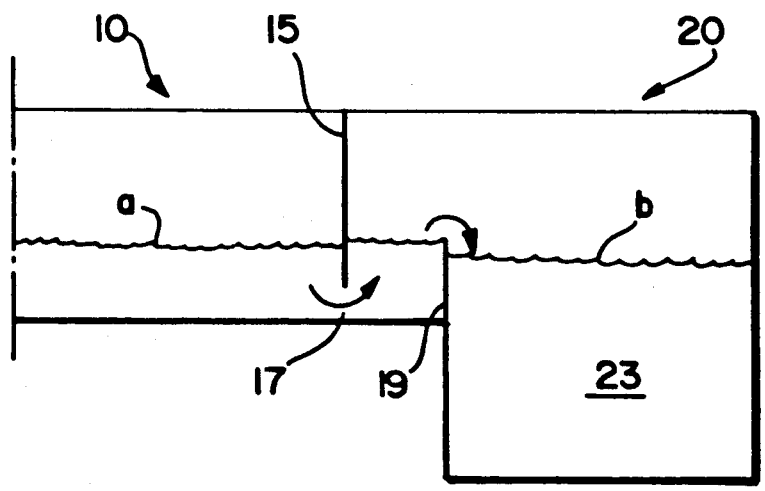
FIG. 3 is a sectional view taken along line A—A of the furnace of FIG. 2.
Figure 4:
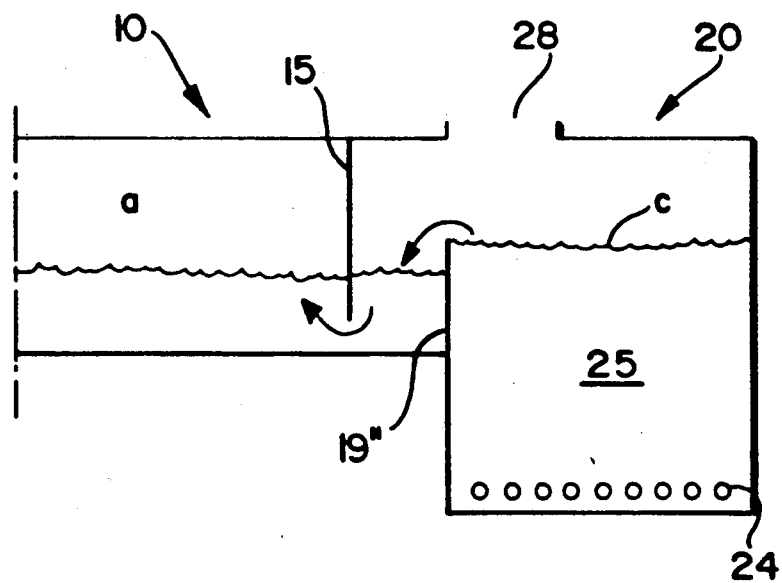
FIG. 4 is a sectional view taken along line B—B of the furnace of FIG. 2.
Figure 5:
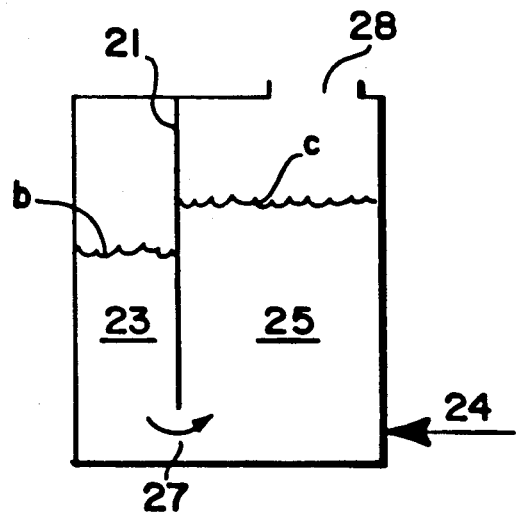
FIG. 5 is a sectional view taken along line C—C of the furnace of FIG. 2.

FIGS. 2-5 are schematic illustrations of a section of a combined furnace for smelting and fuming of zinc concentrate according to the invention. In FIG. 2, which is a top view of the furnace, reference number 10 indicates the smelting furnace and 20 the slag treating or fuming furnace. The gas spaces of the smelting furnace and the slag treating furnace are separated from each other by a partition wall 15. The partition wall 15 extends downwardly in the slag layer itself in the smelting furnace as shown in FIGS. 3 and 4. A gap 17 below the partition wall in the slag layer provides communication between the furnaces. The slag layers in the smelting and slag treating furnaces are separated from each other by a second partition wall 19.

The slag treating or fuming furnace 20 is divided by means of a third partition wall 21 into an inlet zone 23 and a fuming zone 25. The slag level "a" in the smelting furnace is higher than the slag level "b" in the inlet zone 23, and a section 19' of the partition wall 19 provides an overflow for slag from the smelting furnace to the inlet zone.

The third partition wall 21 in the slag treating furnace separates the gas spaces and a great part of the slag layers in the inlet zone and fuming zone from each other. A gap 27 below the partition wall 21 provides communication between the slag layers in the various zones.

Fine coal or hydrocarbon is injected through nozzles 22 into the fuming section for reduction of the slag. Air or other gas containing oxygen is also injected through the nozzles 22. The injection of gases raises the slag level "c" in the fuming section so that it is higher than the slag level "a" in the smelting furnace. The partition wall 19 will therefore function as an overflow for slag from the fuming furnace to the smelting furnace in the section 19" between the fuming zone and the smelting furnace. The differences in the slag level, on one hand between the smelting furnace and the inlet zone and, on the other hand between the fuming furnace and smelting furnace, facilitate continuous transport of slag between the furnaces.

EXAMPLE

In an installment of the type described in FIG. 1, zinc is recovered from zinc concentrate containing 53% Zn, 10% Fe and 1 to 2% $SiO_2$.

Smelting of a ton of ore concentrate results in slagging of about 45% of the zinc. The smelted slag containing about 450 kg zinc is conveyed to the first reduction stage. In the first reduction stage, the slag is reduced to a zinc consistency of 10% with about 450 kg Zn per ton of ore concentrate. 10% of the zinc, i.e. about 45 kg, remains in the slag and is conveyed to the second reduction stage to be reduced there to about 1% Zn in the slag.

Zinc concentrate is oxidized and slagged to a zinc content of about 25% in a smelting furnace. The slag thus formed is taken to a first reduction stage, where the slag is reduced to a zinc consistency of about 10%. A great part of the reduced slag is recirculated to the smelting furnace.

Only about 145 kg zinc per ton of ore concentrate is available to be slagged when the maximum zinc consistency of the slag is about 25%. With reduction to a zinc content of 10%, about 100 kg zinc is separated. For reducing of 450 kg zinc per ton of ore concentrate, the circulation of slag from the reduction stage to the smelting furnace should be about quadruple in order to separate 4×100 kg zinc in the first stage. The remaining 10% zinc oxide in the slag from the first reduction stage is then reduced in a second reduction stage to about 1% zinc.

Consumption of the reducing agent used in the example is about 1.3 to 1.5 kg/kg Zn in reduction to zinc consistencies of 1 to 2% in one stage. Consumption of reducing agents per kg Zn in the reduction to zinc consistencies >10% is much less, about 0.3 to 0.4 kg reducing agent per kg Zn.

In the above example, consumption of reducing agent is thus

| | |
|---|---|
| 400 kg × 0.35 kg reduc agent/kg Zn = 140 kg reducing agent | |
| 45 kg × 1.4 kg reduc agent/kg Zn = 63 kg reducing agent | |
| 445 kg Zn | 203 kg reducing agent |

In reduction of zinc according to the example, 203 kg reducing agent/445 kg Zn=0.45 kg reducing agent/kg Zn.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of treating zinc concentrate for recovering zinc, which method comprises:
    (a) introducing zinc concentrate to a smelting and oxidizing stage where the zinc concentrate is oxidized and smelted by supplying a gas containing oxygen into said smelting and oxidizing stage in such a manner that sulphur dioxide and zinc oxide is formed and said sulphur dioxide is exhausted and said zinc oxide is slagged;
    (b) introducing zinc oxide slag from said smelting and oxidizing stage to a first fuming stage, wherein the slag is reduced by supplying a reducing agent to a zinc consistency of about 5 to about 15% and a reducing gas is exhausted;
    (c) discharging the slag from the first fuming stage;
    (d) recirculating a first part of the slag discharged from the first fuming stage to the smelting and oxidizing stage for absorbing zinc oxide; and
    (e) conveying a second part of the slag discharged from the first fuming stage to a second fuming stage where the slag is reduced to a zinc consistency of less than about 5%.

2. A method according to claim 1 wherein slag is reduced in the first fuming stage to a zinc consistency greater than about 10%.

3. A method according to claim 1 wherein reduced slag from the first fuming stage is introduced into the smelting and oxidizing stage to such an extent that the slag remains of a consistency such that the zinc content does not exceed about 25%.

4. A method according to claim 1, wherein more than half of the reduced slag from the first fuming stage is recirculated to the smelting and oxidizing stage.

5. A method according to claim 1, wherein the slag is reduced in the second fuming stage to a zinc content of less than about 2%.

6. A method according to claim 1, wherein hot slag from the first fuming stage is recirculated to the smelting and oxidizing stage.

7. A method according to claim 6, wherein slag is continuously fed from a smelting furnace to a fuming furnace and continuously recirculated from the fuming furnace to the smelting furnace.

8. A method according to claim 7, in which treatment of zinc concentrate is effected in a smelting furnace and a slag treating furnace, wherein the smelting zone is separated from the slag treating zone by means of a partition wall, and wherein:
    the slag level in the smelting furnace is maintained at least at the same level as a corresponding slag level in the inlet zone of the slag treating furnace;
    slag is led via an overflow from the smelting furnace to the inlet zone of the slag treating furnace, the inlet zone being separated from the actual fuming zone by means of a partition wall;
    slag is led through a gap below the partition wall from the inlet zone to the actual fuming zone;
    zinc oxide is reduced in the fuming zone to zinc;
    the slag level in the actual fuming zone is raised so as to reach a higher slag level than the slag level in the smelting furnace;
    part of the reduced slag from the fuming zone is led through a second overflow from the fuming zone to the smelting furnace; and a second part of the reduced slag is conveyed to the second fuming stage.

9. A method according to claim 1, wherein zinc produced and gases reduced in the first fuming stage are post-combusted for recovering zinc oxide.

10. A method according to claim 9, wherein post-combustion is effected in the fuming furnace above the slag layer, whereby part of the heat generated in combustion may be utilized in the first fuming stage.

11. A method according to claim 1, wherein gases from the fuming zone are conveyed to a splash condenser for recovery of metallic zinc.

12. A method according to claim 1, wherein inert silicate slag suitable for storing is received from the second fuming stage.

* * * * *